United States Patent
Barz (10) Patent No.: US 11,820,308 B2
(45) Date of Patent: Nov. 21, 2023

(54) PULTRUDED SLEEVE REINFORCEMENT ASSEMBLY

(71) Applicant: Zephyros, Inc., Romeo, MI (US)

(72) Inventor: Bill Barz, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 271 days.

(21) Appl. No.: 17/424,816

(22) PCT Filed: Dec. 17, 2019

(86) PCT No.: PCT/US2019/066743
§ 371 (c)(1),
(2) Date: Jul. 21, 2021

(87) PCT Pub. No.: WO2020/154051
PCT Pub. Date: Jul. 30, 2020

(65) Prior Publication Data
US 2022/0080912 A1  Mar. 17, 2022

Related U.S. Application Data

(60) Provisional application No. 62/796,127, filed on Jan. 24, 2019.

(51) Int. Cl.
*B60R 19/34* (2006.01)
*B60R 19/03* (2006.01)
*B60R 19/12* (2006.01)

(52) U.S. Cl.
CPC ............. *B60R 19/34* (2013.01); *B60R 19/03* (2013.01); *B60R 19/12* (2013.01)

(58) Field of Classification Search
CPC ......... B60R 19/34; B60R 19/03; B60R 19/12; F16F 7/125

USPC ........................................................ 293/133
See application file for complete search history.

(56) References Cited

U.S. PATENT DOCUMENTS

| | | | |
|---|---|---|---|
| 8,132,851 B2 * | 3/2012 | Steller | B60R 19/12 |
| | | | 293/133 |
| 10,570,258 B2 | 2/2020 | Richardson et al. | |
| 11,110,670 B2 | 9/2021 | Richardson et al. | |
| 2015/0129116 A1 | 5/2015 | Richeton et al. | |
| 2018/0036970 A1 | 2/2018 | Chmielewski et al. | |

(Continued)

FOREIGN PATENT DOCUMENTS

| | | | | |
|---|---|---|---|---|
| DE | 19603953 C1 | 4/1997 | | |
| DE | 102005039467 B3 * | 3/2007 | ........... | B62D 21/152 |

(Continued)

OTHER PUBLICATIONS

International Search Report dated Mar. 13, 2020, PCT Application No. PCT/US2019/066743.

*Primary Examiner* — Pinel E Romain
(74) *Attorney, Agent, or Firm* — The Dobrusin Law Firm, P.C.

(57) ABSTRACT

A reinforcement structure (10) comprising: (i) one or more members (12, 12A, 12B), the one or more members having one or more projections (20) extending from a base (16) of the one or more members; and (ii) one or more sleeves (28) surrounding the one or more projections (20) and secured to the one or more members, wherein the one or more sleeves and the one or more members are configured to crumple to absorb a force being applied to the reinforcement structure.

20 Claims, 3 Drawing Sheets

(56) References Cited

U.S. PATENT DOCUMENTS

| | | |
|---|---|---|
| 2018/0037703 A1 | 2/2018 | Richardson et al. |
| 2018/0304841 A1 | 10/2018 | Lu et al. |
| 2020/0157293 A1 | 5/2020 | Chmielewski et al. |
| 2021/0053625 A1 | 2/2021 | Richardson |
| 2021/0237377 A1 | 8/2021 | Richardson |
| 2022/0097776 A1 | 3/2022 | Royston |

FOREIGN PATENT DOCUMENTS

| | | | |
|---|---|---|---|
| DE | 102013000269 A1 * | 7/2014 | ............ B60R 19/34 |
| DE | 102013000269 A1 | 7/2014 | |
| DE | 102014016024 A1 | 5/2016 | |
| JP | S49/49638 U | 5/1974 | |
| WO | WO-2016148635 A1 * | 9/2016 | ............ B60R 19/18 |
| WO | 2020/198139 A1 | 10/2020 | |
| WO | 2020/205192 A1 | 10/2020 | |
| WO | 2020/214769 A1 | 10/2020 | |
| WO | 2021/080917 A1 | 4/2021 | |

\* cited by examiner

PULTRUDED SLEEVE REINFORCEMENT ASSEMBLY

FIELD

The present teachings generally relate to a reinforcement assembly, and more specifically, to a reinforcement assembly having one or more sleeves configured for structural reinforcement and load bearing.

BACKGROUND OF THE INVENTION

Reinforcement structures may be frequently used in transportation vehicles. The reinforcement structures may be configured to structurally support one or more members of a transportation vehicle and act as a load bearing member. Additionally, or alternatively, the reinforcement structures may be configured for load bearing or impact absorbance during deformation of the vehicle. For example, transportation vehicles such as automobiles may frequently be at risk of a vehicle crash, resulting in high-impact on one or more portions of the vehicle, thereby potentially harming one or more occupants in the automobile. Because of the threat of bodily harm for occupants, reinforcement structures may be added in high-impact zones of a vehicle to absorb and/or deflect all or a portion of a force impacting the vehicle, resulting in a substantially decreased force reaching the one or more occupants in the vehicle.

Frequently, transportation vehicles may utilize one or more designated "crush" zones located in the high-impact zones that are configured to absorb a force by crumpling in a desired manner. However, crush zones may require significant customization and Finite Element Analysis (FEA) for a given vehicle, thereby requiring extensive development for each unique vehicle being developed. As a result of this customization, each specific vehicle may have its own reinforcement structure and design, requiring separate tooling and manufacturing for each vehicle.

It would be attractive to have a reinforcement structure that provides force absorption and deflection. What is needed is a reinforcement structure having one or more integrated components that promote force absorption and deflection. It would be attractive to have an interchangeable reinforcement structure that may be utilized across various vehicle platforms. What is needed is a more universal reinforcement structure that may be integrated into a plurality of vehicle platforms. It would be attractive to have a reinforcement structure that decreases tooling and manufacturing costs. What is needed is a reinforcement structure manufactured in a more efficient manner.

SUMMARY

The present teachings meet one or more of the present needs by providing: a reinforcement structure comprising: (i) one or more members, the one or more members having one or more projections extending from a base of the one or more members; and (ii) one or more sleeves surrounding the one or more projections and secured to the one or more members, wherein the one or more sleeves and the one or more members are configured to crumple to absorb a force being applied to the reinforcement structure.

The present teachings meet one or more of the present needs by providing: a method of assembling a reinforcement structure comprising: (i) obtaining a first member having a first and a second projection extending from a base of the first member; (ii) positioning a first sleeve over the first projection and securing a first end of the first sleeve to a flange located at a junction between the first projection and the base; (iii) positioning a second sleeve over the second projection and securing a first end of the second sleeve to a flange located at a junction between the second projection and the base; and (iv) securing a second opposing member having a first and a second projection to the first member, the first sleeve, and the second sleeve by inserting the first projection and the second projection into the first sleeve and the second sleeve, respectively, wherein the first and the second projection of the first member are secured to the first and the second projection of the second member, respectively, within the first sleeve and the second sleeve.

The present teachings meet one or more of the present needs by providing a reinforcement structure, wherein: each of the one or more projections are surrounded by the one or more sleeves; the one or more sleeves comprise a channel formed by a plurality of interconnecting walls; the one or more sleeves are a pultruded member; a single sleeve surrounds a plurality of interconnected projections; the one or more sleeves are secured to a flange positioned near a junction between the base and the one or more projections; the one or more projections include an aperture positioned between opposing fingers extending from a distal end of the one or more projections; the one or more members is a pair of opposing members secured to one another via the opposing fingers of the one or more projections, the one or more sleeves is a single sleeve surrounding the pair of opposing members and secured to the flanges of the opposing members, and the single sleeve spans a distance between the opposing members; the one or more members are secured to a mounting plate of a vehicle; the one or more sleeves have a cross-section that is substantially uniform along a length of the one or more sleeves; the cross-section is rectangular; the one or more sleeves crumple simultaneously with the one or more members to absorb the force; the one or more sleeves crumple prior to the one or more members crumpling to absorb the force in a sequential manner; the one or more members crumple prior to the one or more sleeves to absorb the force in a sequential manner; the one or more sleeves are a thermoplastic epoxy, a glass filled polyurethane, or a combination thereof; the one or more sleeves are secured to the one or more members free of any secondary fasteners; or a combination thereof.

The present teachings meet one or more of the present needs by providing a method of assembling a reinforcement structure, wherein: the reinforcement structure is positioned between opposing mounting plates of a vehicle, and one or more fasteners secure the reinforcement structure to the opposing mounting plates; at least one of the opposing mounting plates is a bumper mounting plate of the vehicle; or a combination thereof.

The present teachings provide: a reinforcement structure that provides force absorption and deflection; a reinforcement structure having one or more integrated components that promote force absorption and deflection; an interchangeable reinforcement structure that may be utilized across various vehicle platforms; a more universal reinforcement structure that may be integrated into a plurality of vehicle platforms; a reinforcement structure that decreases tooling and manufacturing costs; a reinforcement structure manufactured in a more efficient manner; or a combination thereof.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein relate to a reinforcement structure. The reinforcement structure may function to reinforce a transportation vehicle. The reinforcement structure may function to act as a load bearing member, an impact absorbing member, or both of a transportation vehicle. The transportation vehicle may be an automobile, boat, truck, airplane, tractor, heavy-machinery equipment, or a combination thereof. The reinforcement structure may be any portion of a vehicle's structure that acts as a load bearing member, an impact absorbing member, or both. The reinforcement structure may be positioned in a desired located of the vehicle that requires additional structural support. For example, the reinforcement structure may be located in a high-impact "crush" zone of a vehicle, the "crush" zone being a portion of the vehicle frequently impacted by external forces. The reinforcement structure may be structurally rigid to increase strength of the reinforcement structure against external forces. The reinforcement structure may be configured to crumple at designated locations to absorb a portion or all of an external force applied to a vehicle. For example, the reinforcement structure may have structurally rigid portions securing the reinforcement structure to opposing mounting positions on the vehicle, and also have an intermediate connecting portion that crumbles during vehicle impact so that a distance between the structurally rigid portions decreases.

The reinforcement structure may absorb a portion of an external force applied to a vehicle. The reinforcement structure may absorb substantially all of an external force applied to a vehicle. The reinforcement structure may absorb about 20% or more, about 40% or more, or about 60% or more of the external force. The reinforcement structure may absorb about 100% or less, about 80% or less, or about 65% or less of the external force. The reinforcement structure may absorb and/or deflect a desired portion of an external force to prevent the external force from impacting one or more occupants within a vehicle. The reinforcement structure may have one or more elastic portions, one or more inelastic portions, or both. The reinforcement structure may be configured to reinforce a bumper of a vehicle, one or more door panels of a vehicle, a floor pan of a vehicle, a roof of a vehicle, or a combination thereof. For example, the reinforcement structure may be mounted between a front bumper and a body of the vehicle so that, upon impact of the front bumper, the reinforcement structure absorbs all or a portion of the impact.

The reinforcement structure may include one or more members. The member may function as a load bearing portion of the reinforcement structure, as an impact absorbing portion of the reinforcement structure, as a force-deflecting portion of the reinforcement structure, or a combination thereof. The member may be mounted to one or more portions of a vehicle, such as a mounting plate. The member may be substantially rigid, yet crumple during an impact of the vehicle (e.g., a crash). For example, the member may be substantially rigid during assembly of the reinforcement structure, yet over a desired threshold of impact force, the member may crumble. The member may be any size and shape required for assembly within a desired application. The member may include one or more cutouts, one or more lips, one or more contoured surfaces, one or more steps, one or more mechanical fasteners, one or more flat surfaces, one or more grooves, or a combination thereof. The member may have one or more mating surfaces that has a contour sufficiently similar to a surface of a vehicle (e.g., a surface of a mounting plate of the vehicle) so that the mating surface of the member may abut the surface of the vehicle in a substantially flush manner. The member may be substantially hollow or may include one or more hollow portions. The member may be substantially solid.

A plurality of members may be interconnected within the reinforcement structure. For example, a first member may be connected to an opposing second member. The first member and the opposing second member may be fixedly attached to one another or removably attached to one another. Alternatively, the reinforcement structure may include a single member.

The member may include a base. The base may function as the mounting portion of the member to mount the member to one or more portions of the vehicle. The base may function as a portion of the member that secures one or more projections of the member. The base may be substantially flat. The base may include one or more contoured portions, one or more steps, one or more notches, one or more ridges, one or more lips, one or more flanges, or a combination thereof. The base may be any desired shape to mount to a desired portion of the vehicle. The base may have one or more surfaces free of contact with a surface of the vehicle. For example, the base may include a first surface that abuts a surface of the vehicle, and a second opposing surface that abuts one or more sleeves of the reinforcement structure, free of contact with the surface of the vehicle.

One or more projections may extend from a surface of the base. The projection may function as a load bearing portion of the member, as an impact absorbing portion of the member, as a force-deflecting portion of the member, or a combination thereof. The projection may be substantially orthogonal to the base. The projection may form an angle with the base other than substantially orthogonal. The projection and the base may form an angle of about 30 degrees or more, about 45 degrees or more, or about 60 degrees or more. The projection and the base may form an angle of about 120 degrees or less, about 105 degrees or less, or about 90 degrees or less. The projection may have one or more columns, pillars, fingers, supports, stanchions, or a combination thereof. The one or more columns, pillars, fingers, supports, stanchions, or a combination thereof may project towards a mutually exclusive location so that the one or more columns, pillars, fingers, supports, stanchions, or a combination thereof join together. The projection may have any desired length or height. The projection may be integrally formed with the base of the member. For example, the member may be an injection molded or stamped component that includes a plurality of projections.

The member may include a plurality of projections. The plurality of projections may project from the same surface of the base or may project from different surfaces of the base. The member may include a pair of projections. The member may include any desired number of projections. For example, the member may include three or more projections, four or more projections, or five or more projections. The member may include ten or less projections, eight or less projections, or six or less projections. The plurality of projections may vary in size and shape. For example, a first projection may have a length less than a length of a second projection, or vice versa.

The projection may include one or more fingers. The one or more fingers may function to secure the member to one or more additional members, the vehicle, one or more mounting plates, or a combination thereof. The fingers may project from a distal end of the projection (i.e., an end of the projection opposing an end secured to the base of the member). The fingers may be configured to interlock with fingers of additional members. For example, a first projection of a first member may have a pair of opposing fingers that interlock with a pair of opposing fingers of a first projection of a second member. The fingers may elastically deform to secure the projection. The fingers may be received by one or more holes, notches, grooves, teeth, lips, steps, or a combination thereof. The fingers may be uniform in shape or may have different shapes. For example, a first pair of fingers may have a length greater than a second pair of fingers. The fingers may project in a direction substantially orthogonal to the base of the member (i.e., in a direction substantially parallel to an axis of the projection). The fingers may project from any surface of the projection. For example, the fingers may form an angle with a surface of the projection of about 30 degrees or more, about 45 degrees or more, or about 60 degrees or more. The fingers and the surface of the projection may form an angle of about 120 degrees or less, about 105 degrees or less, or about 90 degrees or less.

An aperture of the projection may be positioned between, or adjacent to, one or more fingers. The aperture may function to receive one or more fasteners to secure the member to one or more mounting plates, the vehicle, one or more additional members, or a combination thereof. The aperture may be positioned on any surface of the projection. The aperture may be positioned near a distal end of the aperture. The aperture may align with one or more additional apertures of additional members, mounting plates, the vehicle, or a combination thereof. The aperture may be any size and shape to receive a fastener. The fastener may be a clip, screw, bolt, pin, rod, finger, or a combination thereof. The aperture may be circular, oval, rectangular, square, triangular, or a combination thereof.

A flange may be located near an intersecting portion, or junction, between the projection and the base. The flange may function to secure one or more sleeves of the reinforcement structure to the base of the member. The flange may provide a press-fit condition with an inner channel of the one or more sleeves to mechanically secure the one or more sleeves. The flange may be any size and shape. The flange may follow a peripheral surface of the projection. The flange may be integrally formed with the base, the projection, or both. The flange may include one or more adhesives to secure the one or more sleeves. The flange may be free of one or more adhesives. The flange may include one or more friction modifiers, such as grease, oil, silicone, other lubricant, or a combination thereof, to decrease friction between the one or more sleeves and the flange. An inner edge of the flange may follow a peripheral surface of the projection while an outer edge of the flange may follow a contour of a channel of the one or more sleeves so that the outer edge of the flange mates with the channel of the one or more sleeves.

The sleeve may function as a load bearing portion of the reinforcement structure, as an impact absorbing portion of the reinforcement structure, as a force-deflecting portion of the reinforcement structure, or a combination thereof. The sleeve may function as a housing for the one or more projections. The sleeve may function to protect the one or more projections from debris, moisture, environmental degradation, or a combination thereof. The sleeve may work in conjunction with the one or more projections to provide load bearing, impact absorption, force-deflection, or a combination thereof. For example, the sleeve may crumple upon impact prior to crumpling of the one or more projections. Alternatively, the sleeve may crumple upon impact after crumpling of the one or more projections to provide a staggered manner of impact resistance, impact absorption, or both. The sleeve and the one or more projections may crumple in a similar manner, simultaneously, or both. The sleeve may connect to the one or more flanges of the members to form a hermetically sealed environment for the one or more projections.

The sleeve may include one or more interconnecting walls. The walls may function to form an outer peripheral surface of the sleeve. The walls may function to form an inner channel of the sleeve. For example, a plurality of walls may abut one another to form a channel of the sleeve. The sleeve may include a plurality of walls, or may include a single uniform wall. For example, the sleeve may be substantially cylindrical and include a substantially uniform outer surface the forms the cylindrical shape. The walls may be integrally formed or may be secured to one another using one or more fasteners, one or more adhesives, or a combination thereof.

The walls may form a channel. The channel may function to surround all or a portion of one or more projections. The channel may house the one or more projections. The channel may be secured to one or more flanges of the members. The channel may have a shape substantially similar to a shape of the one or more projections, or may be different. The channel may have a substantially uniform cross-section along a length of the sleeve. The channel may have a length greater than, less than, or equal to the one or more projections. The channel may have a cross-section having a shape substantially rectangular, square, circular, oval, triangular, trapezoidal, rhombus, equilateral, or a combination thereof. The channel may have a cross-section having a shape substantially similar to a cross-section of the outer surface of the sleeve. The channel may have one or more ribs, one or more notches, one or more cutouts, or a combination thereof to promote crumpling of the sleeve during impact.

The channel may have one or more openings. The openings may function to receive the one or more projections so that the one or more projections may be housed in the sleeve. The openings may function to secure the sleeve to the flanges of the members. The openings may be located near terminal ends of the sleeves. The openings may have a tapering to ease insertion of the flange into the opening of the sleeve. The openings may be a pair of openings located at opposing ends of the sleeve.

A single sleeve may house a plurality of projections. For example, a pair of opposing and interconnected projections may be secured within a single sleeve. A plurality of sleeves may house a single projection. For example, a plurality of sleeves may abut each other along a length of a projection to house the projection. Alternatively, the projection may be housed within an inner sleeve, and an outer sleeve may house both the projection and the inner sleeve.

The sleeve may be injection-molded or extruded. The sleeve may be pultruded. The sleeve may be pultruded and cut into desired lengths for a given application. The sleeve may be any desired material. The sleeve may be a polymer. The sleeve may be a polyurethane. The sleeve may be an epoxy. The sleeve may include one or more additives to increase structural integrity, change mechanical and/or chemical properties, or a combination thereof. The one or more additives may be glass fibers, plasticizers, flame retardants, acid scavengers, light and/or heat stabilizers, lubricants, antistatic agents, or a combination thereof. The sleeve may be made from the materials disclosed in U.S. Patent Publication No. 2018/0037703, all of which is incorporated by reference herein for all purposes.

The reinforcement structure may be secured to one or more mounting plates. The mounting plates may function as attachment locations to secure the reinforcement structure to the vehicle, one or more components of the vehicle, or both. The mounting plates may be positioned anywhere along a frame of the vehicle. The mounting plates may be positioned on one or more fascia components of the vehicle. For example, the mounting plates may be positioned on an inner surface of one or more bumpers, one or more door panels, or both. The mounting plates may be any size and shape. The mounting plates may mate with one or more surfaces of the reinforcement structure to secure the reinforcement structure. For example, the mounting plates may be secured to one or more surfaces of the one or more members, such as a surface of the base.

The reinforcement structure may be secured between a plurality of mounting plates and may span a distance between the plurality of mounting plates. For example, the reinforcement structure may span a distance between a first mounting plate secured to a frame of the vehicle and a second mounting plate secured to an inner surface of a bumper. Alternatively, the reinforcement structure may be secured to a single mounting plate so that one end of the reinforcement structure is free of contact with one or more additional components of the vehicle.

The mounting plates have one or more through-holes. The through-holes may function to receive one or more fasteners and secure the reinforcement structure to the mounting plates. The through-holes may be coaxial with the one or more apertures of the projections so that one or more fasteners may extend through both the through-holes and the one or more apertures. The through-holes may be any size and shape. The through-holes may have a shape substantially similar to the apertures of the projections. The through-holes may be oversized relative to the apertures of the projections to allow for easier installation of the one or more fasteners.

Figure 1:
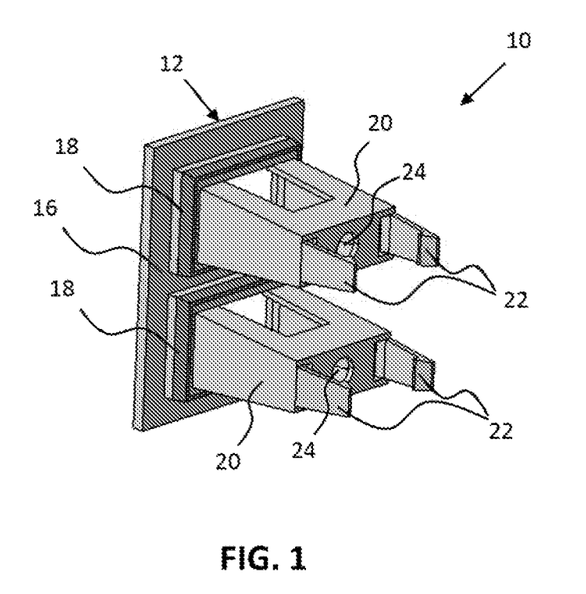
FIG. 1 is a perspective view of a reinforcement structure.

Turning now to the figures, FIG. 1 illustrates a perspective view of a reinforcement structure 10. The reinforcement structure 10 includes a member 12. The member 12 includes a base 16. The base 16 includes a plurality of projections 20 each extending from a flange 18 of the base 16. Each projection 20 includes an aperture 24 positioned between a pair of fingers 22.

Figure 2:
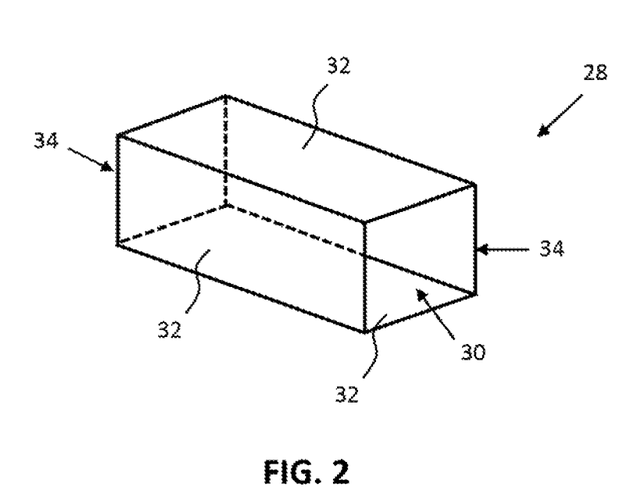
FIG. 2 is a perspective view of a sleeve.
Figure 3:
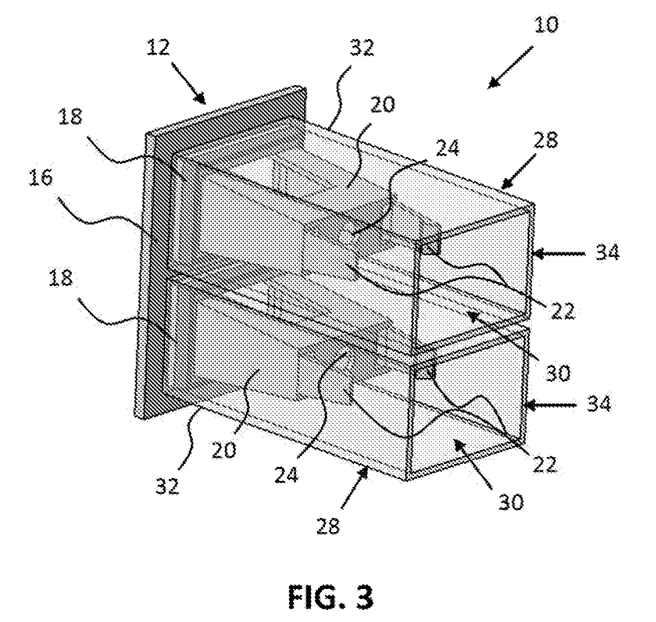
FIG. 3 is a perspective view of a reinforcement structure having a plurality of sleeves.
Figure 4:
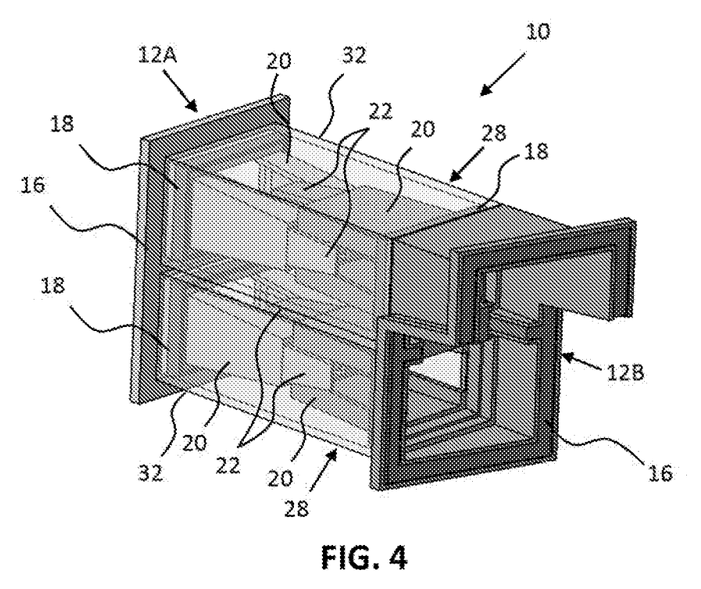
FIG. 4 is a perspective view of a reinforcement structure having a plurality of sleeves secured between a first member and a second member.
Figure 5:
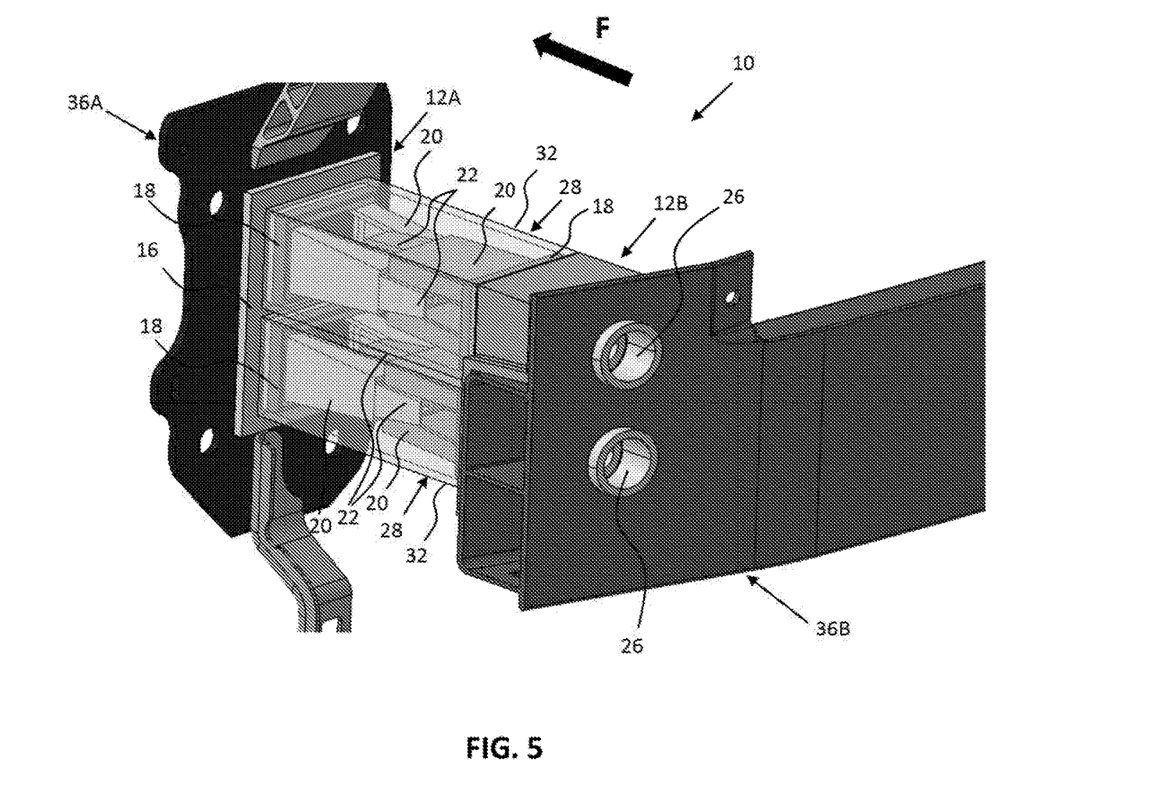
FIG. 5 is a perspective view of a reinforcement structure secured between a first mounting plate and a second mounting plate.

FIG. 2 illustrates a perspective view of a sleeve 28 configured for a reinforcement structure (see FIGS. 3-5). The sleeve 28 includes a channel 30 formed by a plurality of interconnecting walls 32. The channel 30 extends between openings 34 located on opposing ends of the sleeve 28. It should be noted that while the sleeve 28 is shown as having a substantially rectangular shape, the sleeve 28 may be any shape and dimensions needed for any desired reinforcement structure application.

FIG. 3 illustrates a perspective view of a reinforcement structure 10 having a plurality of sleeves 28. Each sleeve 28 includes a channel 30 formed by a plurality of interconnecting walls 32. The channel 30 extends between openings 34 located on opposing ends of the sleeve 28. The sleeves 28 are secured to a member 12 of the reinforcement structure 10. The member 12 includes a base 16. The base 16 includes a plurality of projections 20 each extending from a flange 18 of the base 16. Each projection 20 includes an aperture 24 positioned between a pair of fingers 22. As shown, a sleeve 28 extends over each projection 20 so that the projection 20 is positioned within the channel 30 of the sleeve 28. A terminal end of the sleeve 28 abuts the base 16 of the member 12 so that the flange 18 of the member 12 is secured within the channel 30.

FIG. 4 illustrates a perspective view of a reinforcement structure 10 having a plurality of sleeves 28 secured between a first member 12A and a second member 12B. Each sleeve 28 includes a channel formed by a plurality of interconnecting walls 32. The channel extends between openings located on opposing ends of the sleeve 28 (see FIG. 2). The sleeves 28 are secured between the first member 12A and the second member 12B of the reinforcement structure 10. The members 12 include a base 16. The base 16 includes a plurality of projections 20 each extending from a flange 18 of the base 16. Each projection 20 includes an aperture positioned between a pair of fingers 22 (see FIGS. 1 and 3). As shown, the projections 20 of the first member 12A are interconnected with the projections 20 of the second member 12B via the fingers 22. The fingers 22 secure opposing projections 20 by interlocking the projections. A sleeve 28 extends over each pair of interlocked projections 20 so that the interlocked projections 20 are positioned within the channel of the sleeve 28. Opposing terminal ends of the sleeves 28 abut the bases 16 of the first member 12A and the second member 12B so that the flanges 18 of the first member 12A and the second member 12B are secured within the channel 30 and the sleeves 28 extend between the first member 12A and the second member 12B.

FIG. 5 illustrates a perspective view of a reinforcement structure 10 secured between a first mounting plate 36A and a second mounting plate 36B. The reinforcement structure 10 includes a plurality of sleeves 28. Each sleeve 28 includes a channel formed by a plurality of interconnecting walls 32. The channel extends between openings located on opposing ends of the sleeve 28 (see FIG. 2). The sleeves 28 are secured between a first member 12A and a second member 12B of the reinforcement structure 10. The members 12 include a base 16. The base 16 includes a plurality of projections 20 each extending from a flange 18 of the base 16. Each projection 20 includes an aperture positioned between a pair of fingers 22 (see FIGS. 1 and 3). As shown, the projections 20 of the first member 12A are interconnected with the projections 20 of the second member 12B via the fingers 22. The fingers 22 secure opposing projections 20 by interlocking the projections 20. A sleeve 28 extends over each pair of interlocked projections 20 so that the interlocked projections 20 are positioned within the channel of the sleeve 28. Opposing terminal ends of the sleeves 28 abut the bases 16 of the first member 12A and the second member 12B so that the flanges 18 of the first member 12A and the second member 12B are secured within the channel and the sleeves 28 extend between the first member 12A and the second member 12B. As shown, the first member 12A is secured to a first mounting plate 36A while the second member 12B is secured to a second mounting plate 36B. To secure the reinforcement structure 10, one or more fasteners (not shown) may be inserted through one or more through holes 26 of the second mounting plate 36B, the apertures 24 of one or more of the projections 20, or both. Once secured, the reinforcement structure 10 may be configured to absorb all or a portion of a force applied (F). The reinforcement structure 10 may be configured to deform during the force application, resist deformation during the force application, or both. It should be noted that while the force (F) is shown being applied in a direction substantially from the second mounting plate 36B to the first mounting plate 36A, the reinforcement structure 10 may be configured to absorb a force, resist a force, or both from any direction (i.e., any force vector being applied to the reinforcement structure).

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

ELEMENT LIST

10 Reinforcement Structure
12 Member
12A First Member
12B Second Member
16 Base
18 Flange
20 Projection
22 Finger
24 Aperture
26 Through Hole
28 Sleeve
30 Channel
32 Wall
34 Opening
36 Mounting Plate
36A First Mounting Plate
36B Second Mounting Plate
F Direction of Impact Force

What is claimed is:

1. A reinforcement structure comprising:
   (i) one or more members, the one or more members having one or more projections extending from a base of the one or more members; and
   (ii) one or more sleeves surrounding the one or more projections and secured to the one or more members;
   wherein the one or more sleeves and the one or more members are configured to crumple to absorb a force being applied to the reinforcement structure, wherein:
   (a) the one or more sleeves crumple simultaneously with the one or more members to absorb the force;
   (b) the one or more sleeves crumple prior to the one or more members crumpling to absorb the force in a sequential manner; or
   (c) the one or more members crumple prior to the one or more sleeves to absorb the force in a sequential manner.

2. The reinforcement structure according to claim 1, wherein each of the one or more projections are surrounded by the one or more sleeves.

3. The reinforcement structure of claim 1, wherein the one or more sleeves comprise a channel formed by a plurality of interconnecting walls.

4. The reinforcement structure of claim 3, wherein the one or more sleeves are a pultruded member.

5. The reinforcement structure of claim 4, wherein a single sleeve surrounds a plurality of interconnected projections.

6. The reinforcement structure of claim 1, wherein the one or more sleeves are secured to a flange positioned near a junction between the base and the one or more projections.

7. The reinforcement of claim 1, wherein the one or more projections include an aperture positioned between opposing fingers extending from a distal end of the one or more projections.

8. The reinforcement structure of claim 1, wherein the one or more members is a pair of opposing members secured to one another via opposing fingers extending from a distal end of the one or more projections, the one or more sleeves is a single sleeve surrounding the pair of opposing members and secured to flanges positioned near a junction between the base and the one or more projections of the opposing members, and the single sleeve spans a distance between the opposing members.

9. The reinforcement structure of claim 1, wherein the one or more members are secured to a mounting plate of a vehicle.

10. The reinforcement structure of claim 1, wherein the one or more sleeves have a cross-section that is substantially uniform along a length of the one or more sleeves.

11. The reinforcement structure of claim 10, wherein the cross-section is rectangular.

12. The reinforcement structure of claim 1, wherein the one or more sleeves are a thermoplastic epoxy.

13. The reinforcement structure of claim 1, wherein the one or more sleeves are a glass filled polyurethane.

14. A reinforcement structure comprising:
(i) one or more members, the one or more members having one or more projections extending from a base of the one or more members; and
(ii) one or more sleeves surrounding the one or more projections and secured to the one or more members:
wherein the one or more sleeves and the one or more members are configured to crumple to absorb a force being applied to the reinforcement structure; and
wherein the one or more sleeves are secured to the one or more members free of any secondary fasteners.

15. The reinforcement structure of claim 14, wherein the one or more sleeves crumple simultaneously with the one or more members to absorb the force.

16. The reinforcement structure of claim 14, wherein the one or more sleeves crumple prior to the one or more members crumpling to absorb the force in a sequential manner.

17. The reinforcement structure of claim 14, wherein the one or more members crumple prior to the one or more sleeves to absorb the force in a sequential manner.

18. A method of assembling the reinforcement structure of claim 1, comprising:
(i) obtaining a first member having a first and a second projection extending from a base of the first member;
(ii) positioning a first sleeve over the first projection and securing a first end of the first sleeve to a flange located at a junction between the first projection and the base;
(iii) positioning a second sleeve over the second projection and securing a first end of the second sleeve to a flange located at a junction between the second projection and the base; and
(iv) securing a second opposing member having a first and a second projection to the first member, the first sleeve, and the second sleeve by inserting the first projection and the second projection into the first sleeve and the second sleeve, respectively, wherein the first and the second projection of the first member are secured to the first and the second projection of the second member, respectively, within the first sleeve and the second sleeve.

19. The method of claim 18, wherein the reinforcement structure is positioned between opposing mounting plates of a vehicle, and one or more fasteners secure the reinforcement structure to the opposing mounting plates.

20. The method of claim 18, wherein at least one of the opposing mounting plates is a bumper mounting plate of the vehicle.

* * * * *